(12) United States Patent
Girag

(10) Patent No.: US 11,877,572 B2
(45) Date of Patent: Jan. 23, 2024

(54) PORTABLE FLAME PROPELLING DEVICE

(71) Applicant: David Girag, Glendale, CA (US)

(72) Inventor: David Girag, Glendale, CA (US)

(*) Notice: Subject to any disclaimer, the term of this patent is extended or adjusted under 35 U.S.C. 154(b) by 580 days.

(21) Appl. No.: 17/142,553

(22) Filed: Jan. 6, 2021

(65) Prior Publication Data

US 2022/0211028 A1 Jul. 7, 2022

(51) Int. Cl.
*A01M 29/14* (2011.01)
*F23Q 3/00* (2006.01)
*F41H 9/02* (2006.01)
*A01M 15/00* (2006.01)

(52) U.S. Cl.
CPC .............. *A01M 29/14* (2013.01); *F23Q 3/002* (2013.01); *F23Q 3/008* (2013.01); *F41H 9/02* (2013.01); *A01M 15/00* (2013.01)

(58) Field of Classification Search
CPC .. F23Q 2/02; F41H 9/02; A01M 15/00; B05B 7/2464; A62C 3/0285
See application file for complete search history.

(56) References Cited

U.S. PATENT DOCUMENTS

| | | | |
|---|---|---|---|
| 2,631,581 A | 3/1953 | Skousgaard | |
| 2,666,480 A * | 1/1954 | Peterson | F23D 91/02 431/255 |
| 2,683,484 A | 7/1954 | Falligant | |
| 2,720,257 A | 10/1955 | Lynes | |
| 3,033,426 A | 5/1962 | Young | |
| 3,106,238 A * | 10/1963 | Bruce | F41H 9/02 431/267 |
| 3,335,780 A | 8/1967 | Klaubert | |
| 4,220,443 A * | 9/1980 | Bear | F41B 15/04 431/258 |
| 4,348,172 A | 9/1982 | Miller | |
| 4,495,848 A * | 1/1985 | Rozner | F41C 7/00 42/84 |
| 4,526,532 A | 7/1985 | Nelson | |
| 4,720,259 A * | 1/1988 | Day | F23D 14/38 431/255 |
| D413,784 S * | 9/1999 | Tsai | D8/107 |
| 6,145,756 A * | 11/2000 | Kohls | B05B 9/0822 239/524 |
| 6,502,766 B1 * | 1/2003 | Streutker | B05B 9/0861 222/383.2 |

(Continued)

FOREIGN PATENT DOCUMENTS

DE 102006038514 A1 * 2/2008 ............. F23D 14/28

*Primary Examiner* — Jorge A Pereiro

(57) ABSTRACT

A portable flame propelling device for deterring an attack by an animal includes a vessel, which has an opening positioned in a top thereof for positioning of a flammable liquid therein. A handle engaged to the vessel and extending from the opening can be grasped in a hand of a user. A nozzle is engaged to the handle and extends therefrom. A pumping unit operationally engaged to and in fluidic communication with the nozzle and the vessel propels the flammable liquid from the vessel through the nozzle. An igniter engaged to the handle proximate to the nozzle ignites the flammable liquid. An actuator engaged to the handle is operationally engaged to the pumping unit and the igniter. The actuator can be engaged by a digit of the hand of the user to selectively actuate the pumping unit and the igniter so that a flame is propelled from the nozzle.

10 Claims, 5 Drawing Sheets

(56) References Cited

U.S. PATENT DOCUMENTS

| | | | | |
|---|---|---|---|---|
| 6,752,330 B2* | 6/2004 | DiMaggio | B05B 9/0861 | 239/332 |
| 6,966,768 B2 | 11/2005 | Holler | | |
| 7,032,841 B1* | 4/2006 | Swisher | B05B 9/0861 | 222/481.5 |
| 7,562,834 B2* | 7/2009 | Hornsby | B05B 9/007 | 239/351 |
| 8,746,585 B2* | 6/2014 | Harwood | F04B 1/146 | 239/375 |
| 8,834,152 B1* | 9/2014 | Calvert | F41C 27/00 | 431/91 |
| 10,845,165 B1* | 11/2020 | Grimmett | F23Q 2/16 | |
| 2004/0099751 A1* | 5/2004 | Krestine | B05B 9/0861 | 239/302 |
| 2005/0194467 A1* | 9/2005 | Wanbaugh | B05B 9/0861 | 239/351 |
| 2006/0153707 A1* | 7/2006 | Sweeton | F04B 35/04 | 417/411 |
| 2006/0208005 A1* | 9/2006 | Sweeton | B05B 11/1057 | 222/333 |
| 2011/0121110 A1* | 5/2011 | Field | A47L 13/22 | 239/690 |
| 2011/0266367 A1* | 11/2011 | Schaeffer | B05B 11/0008 | 239/375 |
| 2013/0309620 A1 | 11/2013 | Prull | | |
| 2014/0061233 A1* | 3/2014 | Lang | B05B 11/0039 | 220/203.23 |
| 2014/0242529 A1 | 8/2014 | Arnold, III | | |
| 2016/0008827 A1* | 1/2016 | Chan | B05B 3/02 | 417/70 |
| 2017/0173607 A1* | 6/2017 | Wright | B05B 5/0533 | |
| 2017/0291181 A1* | 10/2017 | Wright | B05B 11/0037 | |
| 2018/0169692 A1* | 6/2018 | Olson | B05B 9/0861 | |
| 2021/0278177 A1* | 9/2021 | Clanton | F41H 9/02 | |
| 2021/0318104 A1* | 10/2021 | Gore | F41H 9/02 | |

\* cited by examiner

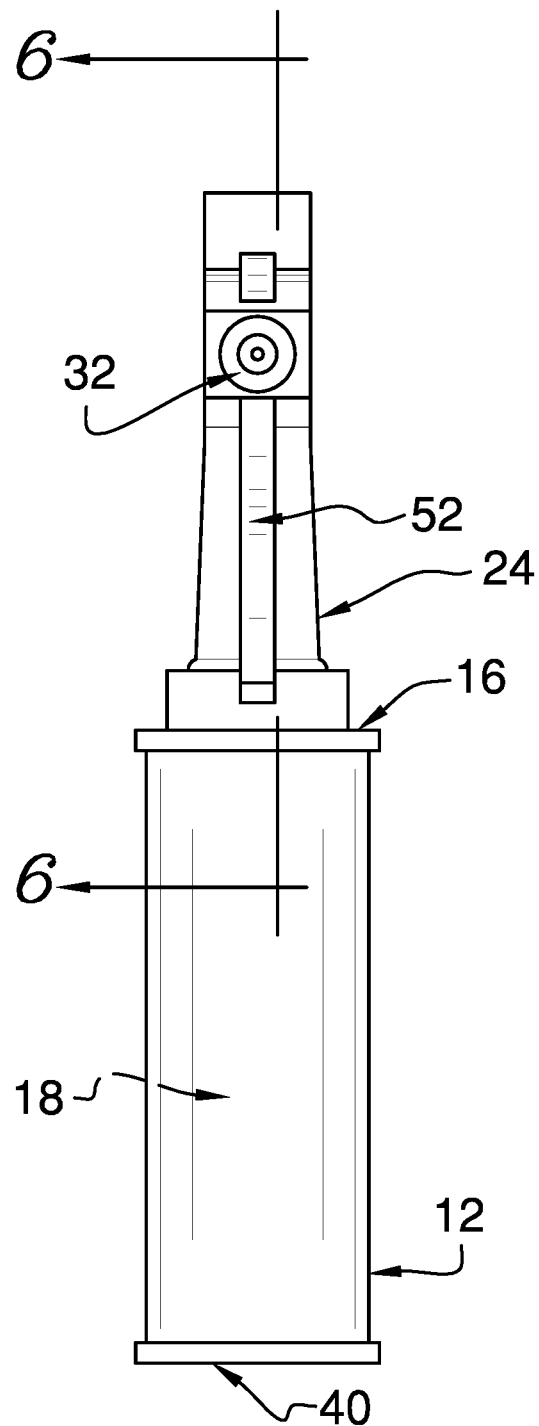
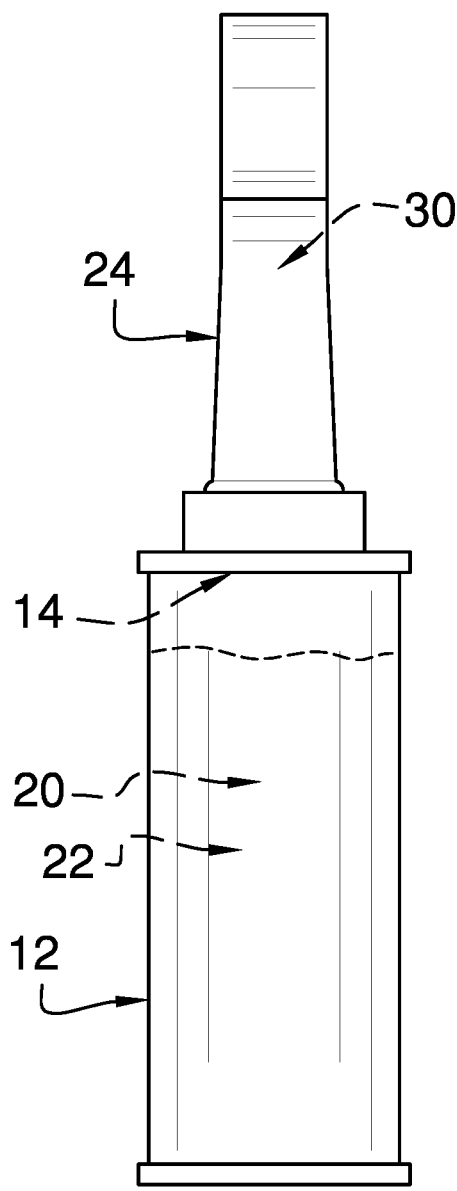
FIG. 2
FIG. 3

PORTABLE FLAME PROPELLING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to flame propelling devices and more particularly pertains to a new flame propelling device for deterring an attack by an animal. The present invention discloses a flame propelling device comprising a non-pressurized vessel, and in particular a non-pressurized vessel engaged to a pump for pumping an alcohol solution from the vessel.

(2) Description of Related Art Including Information Disclosed Under 37 CFR 1.97 and 1.98

The prior art relates to flame propelling devices. Prior art flame propelling devices may comprise tanks containing petroleum based flammable liquids, either under pressure or in combination with a propellent, and an ignition source, which may be piezoelectric. What is lacking in the prior art is a flame propelling device comprising a non-pressurized vessel, and in particular a non-pressurized vessel engaged to a pump for pumping an alcohol solution from the vessel.

BRIEF SUMMARY OF THE INVENTION

An embodiment of the disclosure meets the needs presented above by generally comprising a vessel, which has an opening positioned in a top thereof so that the vessel is configured for having positioned therein a flammable liquid. A handle is engaged to the vessel and extends from the opening. The handle is configured to be grasped in a hand of a user. A nozzle is engaged to the handle and extends therefrom.

A pumping unit is operationally engaged to and is in fluidic communication with the nozzle and the vessel. The pumping unit is configured to propel the flammable liquid from the vessel through the nozzle. An igniter engaged to the handle proximate to the nozzle is configured to ignite the flammable liquid passing through the nozzle. An actuator engaged to the handle is operationally engaged to the pumping unit and the igniter. The actuator is configured to be engaged by a digit of the hand of the user to selectively actuate the pumping unit and the igniter so that a flame is propelled from the nozzle to deter an attack by an animal, such as a bear, lion, dog, or human.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a rear view of an embodiment of the disclosure.

DETAILED DESCRIPTION OF THE INVENTION

Figure 1:
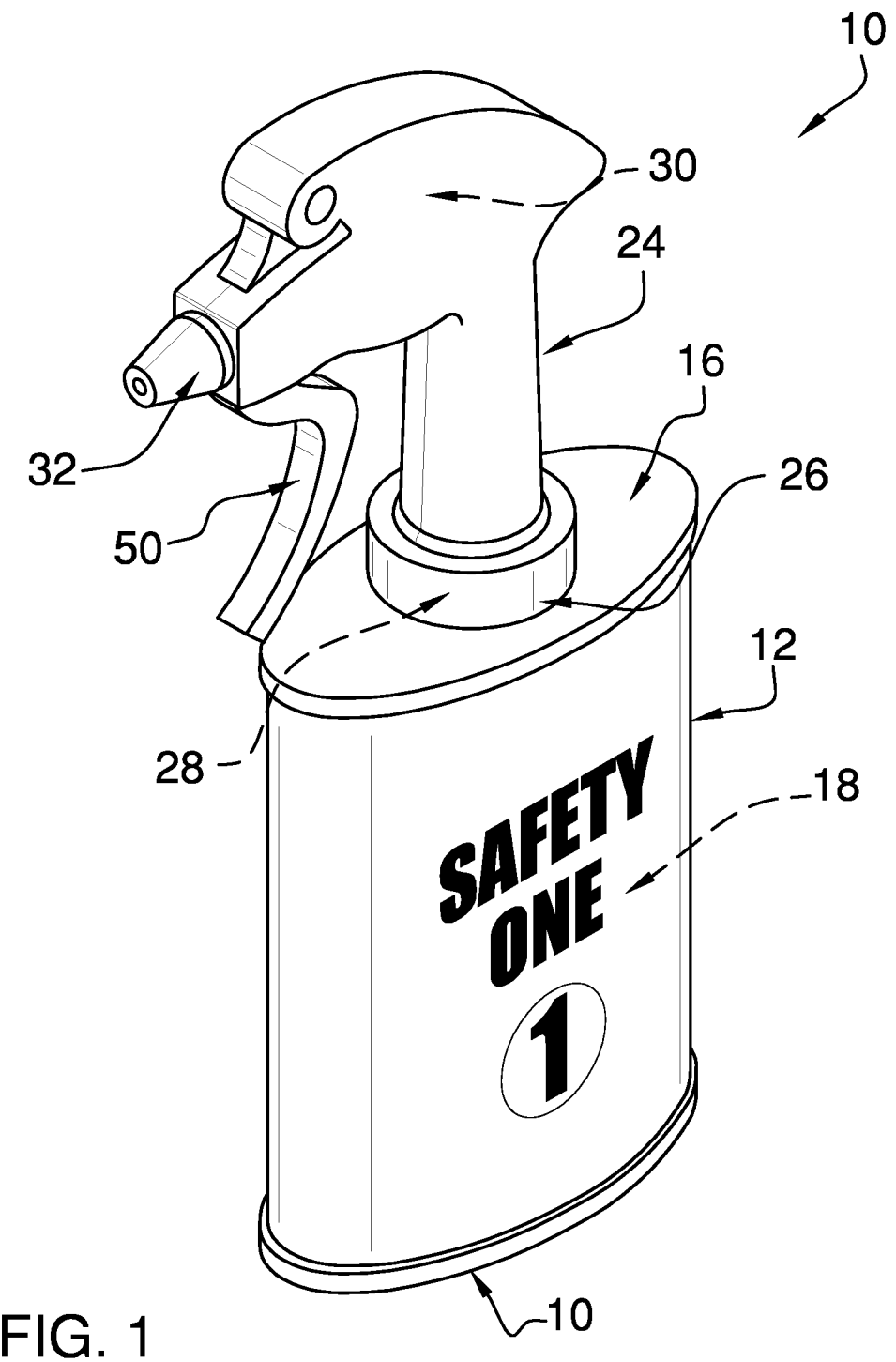
FIG. 1 is an isometric perspective view of a portable flame propelling device according to an embodiment of the disclosure.
Figure 4:
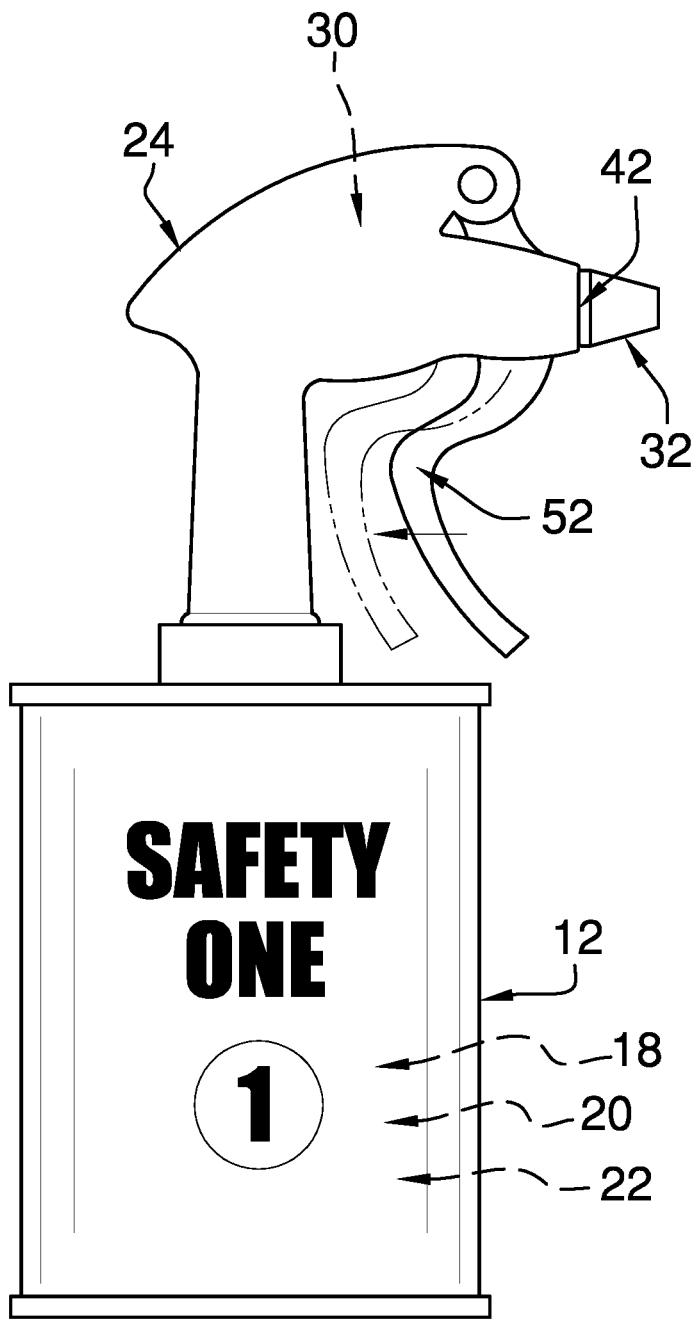
FIG. 4 is a side view of an embodiment of the disclosure.
Figure 5:
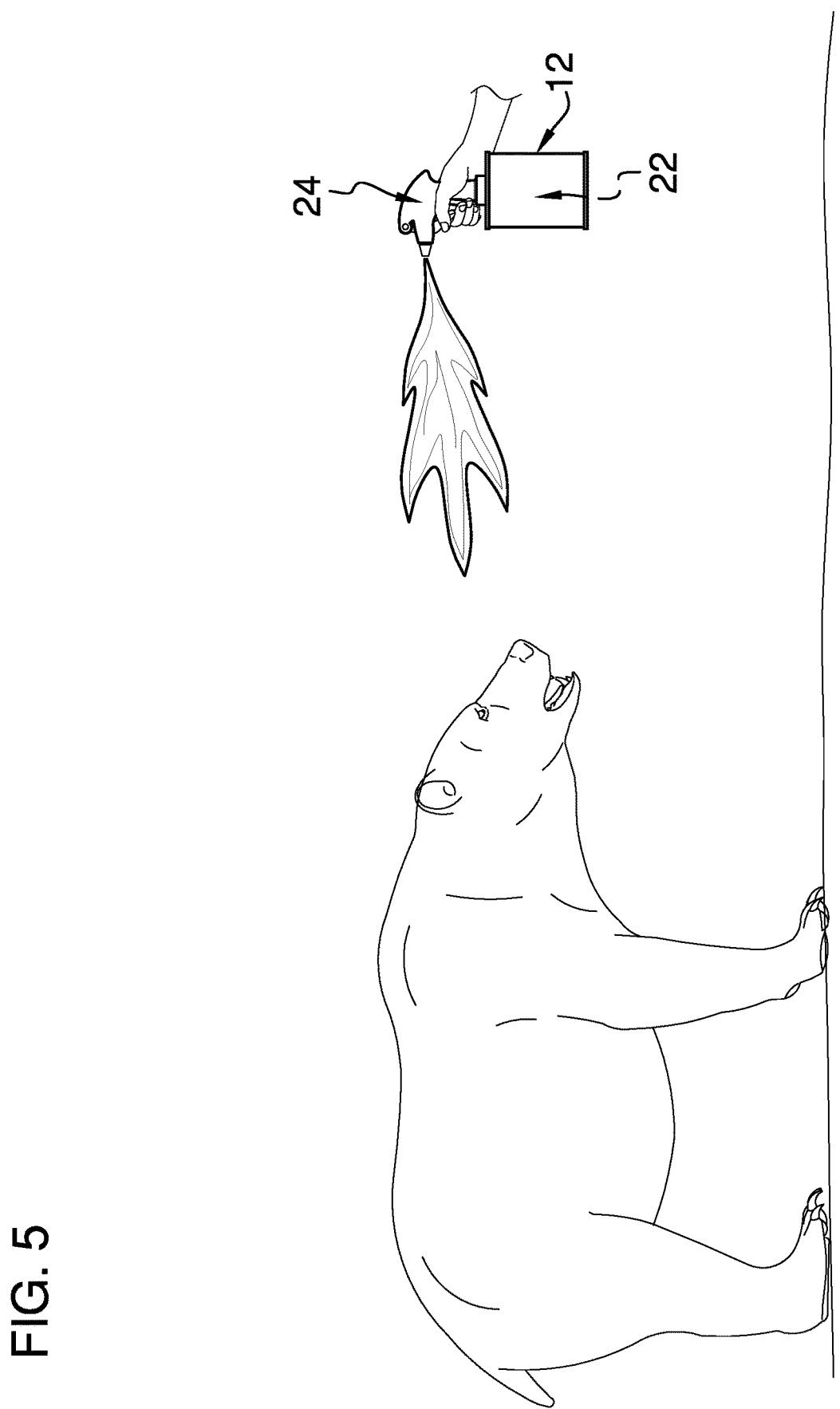
FIG. 5 is an in-use view of an embodiment of the disclosure.
Figure 6:
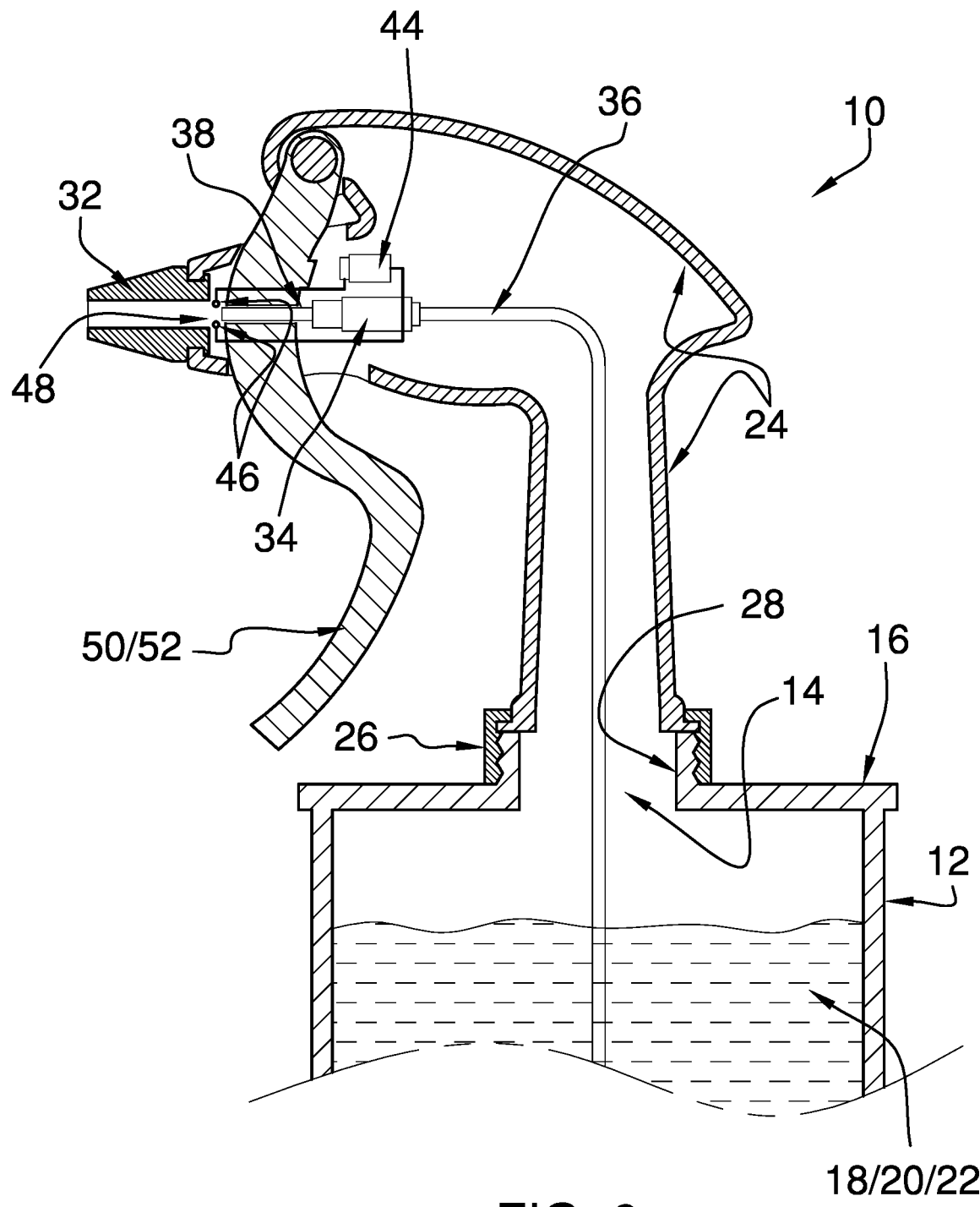
FIG. 6 is a cross-sectional view of an embodiment of the disclosure.

With reference now to the drawings, and in particular to FIGS. 1 through 6 thereof, a new flame propelling device embodying the principles and concepts of an embodiment of the disclosure and generally designated by the reference numeral 10 will be described.

As best illustrated in FIGS. 1 through 6, the portable flame propelling device 10 generally comprises a vessel 12, which has an opening 14 positioned in a top 16 thereof so that the vessel 12 is configured to have positioned therein a flammable liquid 18. The flammable liquid 18 may comprise an alcohol 20, such as, but not limited to, ethyl alcohol 22. The ethyl alcohol 22 comprises at least 91 percent by volume of the flammable liquid 18.

A handle 24 is engaged to the vessel 12 and extends from the opening 14. The handle 24 is configured to be grasped in a hand of a user. The handle 24 is tubular and has a lower end 26. The handle 24 is internally threaded proximate to the lower end 26. A neck 28 is engaged to the vessel 12 and extends from the opening 14, the neck 28 is externally threaded. The handle 24 is positioned for selective threaded insertion of the neck 28 into the lower end 26 so that the handle 24 is removably engaged to the vessel 12.

A pumping unit 30 is operationally engaged to and is in fluidic communication with a nozzle 32 and the vessel 12. The nozzle 32 is engaged to and extends from the handle 24. The pumping unit 30 is configured to propel the flammable liquid 18 from the vessel 12 through the nozzle 32.

The pumping unit 30 may comprise a spray bottle pump 34, which is operationally engaged to and in fluidic communication with a first tube 36 and a second tube 38. The spray bottle pump 34 is positioned in the handle 24. The first tube 36 extends from the spray bottle pump 34 to proximate to a bottom 40 of the vessel 12. The second tube 38 extends from the spray bottle pump 34 to proximate to the nozzle 32. The present invention also anticipates the pumping unit 30 comprising other pumping means, such as, but not limited to, diaphragm pumps, screw pumps, and the like.

An igniter 42 engaged to the handle 24 proximate to the nozzle 32 is configured to ignite the flammable liquid 18 passing through the nozzle 32. The igniter 42 may comprise a piezoelectric element 44, which is operationally engaged to a pair of electrical contacts 46. The igniter 42 may comprise other igniting means, such as, but not limited to, percussion-type sparking devices and the like. The piezoelectric element 44 is engaged to and positioned within the handle 24. The electrical contacts 46 are engaged to the handle 24 proximate to the nozzle 32. The flammable liquid 18 propelled by the pumping unit 30 from the vessel 12 passes proximate to a spark gap 48 defined by the pair of electrical contacts 46.

An actuator 50 engaged to the handle 24 is operationally engaged to the pumping unit 30 and the igniter 42. The actuator 50 is configured to be engaged by a digit of the hand of the user to selectively actuate the pumping unit 30 and the igniter 42 so that a flame is propelled from the nozzle 32 to deter an attack by an animal, such as a bear, lion, dog, human, or the like.

The actuator 50 may comprise a lever 52, which is hingedly engaged to the handle 24. The lever 52 is configured to be selectively levered, by action of one or more digits of the hand of the user, so that the lever 52 engages the spray bottle pump 34 to propel the flammable liquid 18 from the vessel 12 through the nozzle 32. Levering of the lever 52 also causes it to contact the piezoelectric element 44 to generate an electric current that flows across the spark gap 48 to heat and ignite the flammable liquid 18. A flame thus is propelled from the nozzle 32 to discourage an attack by the animal. The present invention also anticipates the actuator 50 comprising other actuating means, such as, but not limited to, switches, depressible buttons, and the like.

In use, the portable flame propelling device 10 can be carried by a user and employed as required to deter an attack by an animal. The handle 24 is grasped in the hand of the user with digits of the hand positioned on the lever 52. When the lever 52 is pulled toward the handle 24, the pumping unit 30 and the igniter 42 are selectively actuated so that a flame is propelled from the nozzle 32. A flame is generated each time the lever 52 is pulled, allowing the user to control how often a flame is propelled from the nozzle 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable flame propelling device comprising:
a vessel having an opening positioned in a top (hereof, such that the vessel is configured for having positioned therein a flammable liquid;
a handle engaged to the vessel and extending from the opening, wherein the handle is configured for grasping in a hand of a user;
a nozzle engaged to the handle and extending therefrom;
a pumping unit operationally engaged to and being in fluidic communication with the nozzle and the vessel, such that the pumping unit is configured for propelling the flammable liquid from the vessel through the nozzle, the pumping unit comprises a spray bottle pump operationally engaged to and in fluidic communication with a first tube and a second tube, the spray bottle pump being positioned in the handle, the first tube extending from the spray bottle, ump to proximate to a bottom of the vessel, the second tube extending from the spray bottle pump to proximate to the nozzle:
an igniter engaged to the handle proximate to the nozzle, such that the igniter is configured for igniting the flammable liquid passing through the nozzle; and
an actuator engaged to the handle and being operationally engaged to the pumping unit and the igniter wherein each of the pumping unit and the igniter are activated upon direct contact with the actuator, wherein the actuator is configured for being engaged by a digit of the hand of the user for selectively actuating the pumping unit and the igniter such that a flame is propelled from the nozzle, wherein the actuator comprises a lever hingedly engaged to the handle, wherein the lever is configured for being selectively levered by action of one or more digits of the hand of the user, such that the lever engages the spray bottle pump by direct contact for propelling the flammable liquid from the vessel through the nozzle, and such that the lever directly contacts the piezoelectric element for generating an electric current, which flows across the spark gap, such that the flammable liquid is heated and ignited and such that a flame is propelled from the nozzle for discouraging an attack by an animal.

2. The portable flame propelling device of claim 1, further including:
the handle being tubular, the handle having a lower end, the handle being internally threaded proximate to the lower end; and
a neck engaged to the vessel and extending from the opening, the neck being externally threaded such that the handle is positioned for selective threaded insertion of the neck into the lower end, such that the handle is removably engaged to the vessel.

3. The portable flame propelling device of claim 1, wherein:
the handle is tubular; and
the igniter comprises a piezoelectric element operationally engaged to a pair of electrical contacts, the piezoelectric element being engaged to and positioned within the handle, the electrical contacts being engaged to the handle proximate to the nozzle, such that the flammable liquid propelled by the pumping unit from the vessel passes proximate to a spark gap defined by the pair of electrical contacts.

4. A portable flame propelling system comprising:
a vessel having an opening positioned in a top thereof;
a flammable liquid positioned in the vessel;
a handle engaged to the vessel and extending from the opening, wherein the handle is configured for grasping in a hand of a user;
a nozzle engaged to the handle and extending therefrom;
a pumping unit operationally engaged to and being in fluidic communication with the nozzle and the vessel, such that, the pumping unit is positioned for propelling the flammable liquid from the vessel through the nozzle, the pumping unit comprises a spray bottle pump operationally engaged to and in fluidic communication with a first tube and a second tube, the spray bottle pump being positioned in the handle, the first tube extending from the spray bottle pump to proximate to a bottom of the vessel, the second tube extending from the spray bottle pump to proximate to the nozzle;
an igniter engaged to the handle proximate to the nozzle, such that the igniter is positioned for igniting the flammable liquid passing through the nozzle; and
an actuator engaged to the handle and being operationally engaged to the pumping unit and the igniter wherein each of the pumping unit and the igniter are activated upon direct contact with the actuator, wherein the actuator is configured for being engaged by a digit of the hand of the user for selectively actuating the pumping unit and the igniter such that a flame is propelled from the nozzle, wherein the actuator comprises a lever hingedly engaged to the handle, wherein the lever is configured for being selectively levered by action of one or more digits of the hand of the user, such that the lever engages the spray bottle pump by direct contact for propelling the flammable liquid from the vessel through the nozzle, and such that the lever directly contacts the piezoelectric element for generating an electric current, which flows across the spark gap, such that the flammable liquid is heated and ignited and such that a flame is propelled from the nozzle for discouraging an attack by an animal.

5. The portable m propelling system of claim 4, further including:
the handle being tubular, the handle having a lower end, the handle being internally threaded proximate to the lower end; and
a neck engaged to the vessel and extending from the opening, the neck being externally threaded such that the handle is positioned for selective threaded insertion of the neck into the lower end, such that, the handle is removably engaged to the vessel.

6. The portable flame propelling system of claim 4, wherein:
the handle is tubular; and
the igniter comprises a piezoelectric element operationally engaged to a pair of electrical contacts, the piezoelectric element being engaged to and positioned within the handle, the electrical contacts being engaged to the handle proximate to the nozzle, such that the flammable liquid propelled by the pumping unit from the vessel passes proximate to a spark gap defined by the pair of electrical contacts.

7. The portable flame propelling system of claim 4, wherein the flammable liquid comprises an alcohol.

8. The portable flame propelling system of claim 7, wherein the alcohol comprises ethyl alcohol.

9. The portable flame propelling system of claim 8, wherein the ethyl alcohol comprises at least 91 percent by volume of the flammable liquid.

10. A portable flame propelling device comprising:
a vessel having an opening positioned in a top thereof, such that the vessel s configured for having positioned therein a flammable liquid;
a handle engaged to the vessel and extending from the opening, wherein the handle is configured for grasping in a hand of a user, the handle being tubular, the handle having a lower end, the handle being internally threaded proximate to the lower end;
a neck engaged to the vessel and extending from the opening, the neck being externally threaded such that the handle is positioned for selective threaded insertion of the neck into the lower end, such that the handle is removably engaged to the vessel;
a nozzle engaged to the handle and extending therefrom;
a pumping unit operationally engaged to and being in fluidic communication with the nozzle and the vessel, such that the pumping unit is configured for propelling the flammable liquid from the vessel through the nozzle, the pumping unit comprising a spray bottle pump operationally engaged to and in fluidic communication with a first tube and a second tube, the spray bottle pump being positioned in the handle, the first tube extending from the spray bottle pump to proximate to a bottom of the vessel, the second tube extending from the spray bottle pump to proximate to the nozzle;
an igniter engaged to the handle proximate to the nozzle, such that the igniter is configured for igniting the flammable liquid passing through the nozzle, the igniter comprising a piezoelectric element operationally engaged to a pair of electrical contacts, the piezoelectric: element being engaged to and positioned within the handle, the electrical contacts being engaged to the handle proximate to the nozzle, such that the flammable liquid propelled by the pumping unit from the vessel passes proximate to a spark gap defined by the pair of electrical contacts; and
an actuator engaged to the handle and being operationally engaged to the pumping unit and the igniter wherein each of the pumping unit and the igniter are activated upon direct contact with the actuator, wherein the actuator is configured for being engaged by a digit of the hand of the user for selectively actuating the pumping unit and the igniter such that a flame is propelled from the nozzle, wherein the actuator comprises a lever hingedly engaged to the handle, wherein the lever is configured for being selectively levered by action of one or more digits of the hand of the user, such that the lever engages the spray bottle pump by direct contact for propelling the flammable liquid from the vessel through the nozzle, and such that the lever directly contacts the piezoelectric element for generating an electric current, which flows across the spark gap, such that the flammable liquid is heated and ignited and such that a flame is propelled from the nozzle for discouraging an attack by an animal.

* * * * *